(12) United States Patent
Korherr et al.

(10) Patent No.: US 8,803,014 B2
(45) Date of Patent: Aug. 12, 2014

(54) CONTACT SWITCHES IN A UNIFORM CONTROL PANEL

(75) Inventors: Joachim Korherr, Orsingen (DE); Harald Koehnlein, Hilzingen (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 241 days.

(21) Appl. No.: 13/382,529

(22) PCT Filed: Jul. 12, 2010

(86) PCT No.: PCT/EP2010/004236
§ 371 (c)(1),
(2), (4) Date: Apr. 25, 2012

(87) PCT Pub. No.: WO2011/015271
PCT Pub. Date: Feb. 10, 2011

(65) Prior Publication Data
US 2012/0205227 A1  Aug. 16, 2012

(30) Foreign Application Priority Data
Aug. 5, 2009  (DE) .......................... 10 2009 036 212

(51) Int. Cl.
*H01H 9/00* (2006.01)

(52) U.S. Cl.
USPC .......................................... 200/314; 200/5 A

(58) Field of Classification Search
USPC ........ 200/5 A, 310, 313, 314, 341; 362/23.05
See application file for complete search history.

(56) References Cited

U.S. PATENT DOCUMENTS

| | | | |
|---|---|---|---|
| 4,225,766 A | 9/1980 | Pfeifer et al. | |
| 4,262,182 A * | 4/1981 | Basler et al. | 200/314 |
| 4,293,764 A * | 10/1981 | Amrhein | 200/302.2 |
| 4,302,647 A * | 11/1981 | Kandler et al. | 200/512 |
| 4,376,879 A | 3/1983 | Nagata et al. | |
| 6,158,867 A * | 12/2000 | Parker et al. | 362/29 |
| 6,180,895 B1 * | 1/2001 | Hutchinson et al. | 200/5 A |
| 6,204,459 B1 | 3/2001 | Kizele et al. | |
| 7,180,017 B2 * | 2/2007 | Hein | 200/5 R |
| 7,255,466 B2 * | 8/2007 | Schmidt et al. | 362/501 |
| 2002/0101738 A1 | 8/2002 | Misaras | |

FOREIGN PATENT DOCUMENTS

| | | |
|---|---|---|
| DE | 3407937 | 12/1985 |
| DE | 19817369 | 11/1998 |
| FR | 2426322 | 5/1979 |
| JP | 63-9720 | 1/1988 |

\* cited by examiner

*Primary Examiner* — Vanessa Girardi
(74) *Attorney, Agent, or Firm* — Tarolli, Sundheim, Covell & Tummino LLP

(57) ABSTRACT

A pushbutton switch array is proposed which provides a uniform operating surface in which switching units are distinguished from dummy elements only by symbols provided on the switching units and the switching units are realized with few functional parts. The pushbutton switch array has a frame which is covered by a transparent film and includes recesses which selectively have an actuating element accommodated therein for displacement or a dummy element accommodated therein so as to be non-displaceable. The actuating elements are provided with symbols on the surface thereof facing the film and hold a printed circuit board at the opposite end. The printed circuit board carries a switch element that cooperates with a contact element on an opposite base plate. The transparent film, which completely covers the frame along with the actuating elements and the dummy elements, provides a continuous smooth surface. Arranged behind the film are the actuating elements, which are identifiable only by the selectively illuminated symbols.

5 Claims, 1 Drawing Sheet

CONTACT SWITCHES IN A UNIFORM CONTROL PANEL

RELATED APPLICATIONS

This application corresponds to PCT/EP2010/004236, filed, which claims the benefit of German Application No. 10 2009 036 212.6, filed Aug. 5, 2009, the subject matter, of which is incorporated herein by reference in its entirety.

BACKGROUND OF THE INVENTION

The present invention relates to a pushbutton switch array which is specially suited for use as an operating panel in a motor vehicle.

Switch arrays that are built into a uniform faceplate are generally known. The faceplate has recesses arranged in a fixed grid, with a complete switch unit or else a dummy cover being inserted in the recesses as required. This is a flexible, though not optimum solution because the recesses closed by a dummy cover are both visible and tactile. Also, it is an involved solution because the switch units used are configured to be completely autonomous with all required functional parts inclusive of the housing.

SUMMARY OF THE INVENTION

The invention provides a pushbutton switch array which provides a uniform operating surface, in which switching units are distinguished from dummy elements only by symbols provided on the switching units and the switching units are realized with few functional parts.

The pushbutton switch array according to the invention has a frame which is covered by a transparent film and includes recesses which selectively have an actuating element accommodated therein for displacement or a dummy element accommodated therein so as to be non-displaceable. The actuating elements are provided with symbols on the surface thereof facing the film and hold a printed circuit board at the opposite end. The printed circuit board carries a switch element that cooperates with a contact element on an opposite base plate. The transparent film, which completely covers the frame along with the actuating elements and the dummy elements, provides a continuous smooth surface. Arranged behind the film are the actuating elements, which are identifiable only by the selectively illuminated symbols. Depending on the switching state, the illumination of the symbols may be different, so that the respective switching state can be easily recognized visually. The switching functions are each implemented by an actuating element in cooperation with the switch element on the printed circuit board and the contact element on the base plate. In comparison with the equipment with autonomous switch units, this is a very cost-effective solution.

Advantageous further developments of the invention are specified in the dependent claims.

BRIEF DESCRIPTION OF THE DRAWINGS

Further advantages and features of the invention will become apparent from the description below given with reference to the accompanying drawings, in which.

DESCRIPTION OF AN EXEMPLARY EMBODIMENT

Figure 1:
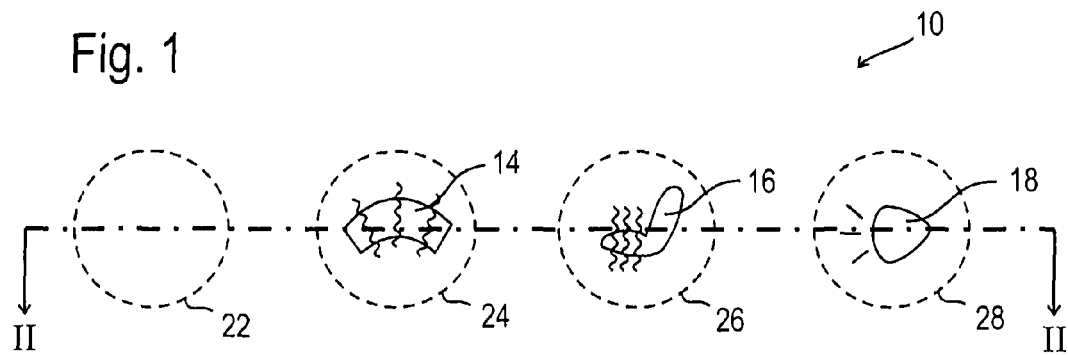
FIG. 1 shows a top view of a pushbutton switch array.
Figure 2:
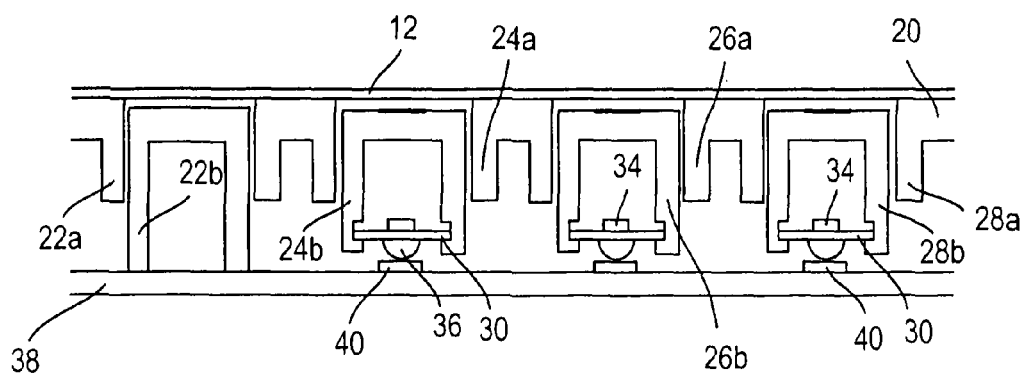
FIG. 2 shows the pushbutton switch array in a schematic sectional view.

FIG. 1 shows a smooth operating panel 10 which is formed by a transparent film 12 (FIG. 2). Three symbols 14, 16, 18 shown by way of example are visible through the film. Round recesses 22, 24, 26, 28 formed in a frame 20 (FIG. 2) under the film are indicated in dashed lines. The recess 22 is not equipped with a switch unit; therefore, no symbol can be seen.

The frame 20 is formed by a plastic support made from an opaque material. The frame has the round recesses 22 to 28 indicated in FIG. 1, which are defined by cylindrical walls 22a, 24a, 26a and 28a. The wails 24a to 28a constitute sliding guides for inserted cap-shaped actuating elements 24b, 26b, 28b, whereas the wall 22a receives a likewise cap-shaped dummy element 22b which is not displaceable.

On their surfaces facing the film 12, the actuating elements 24b, 26b and 28b are provided with the symbols 14, 16 and 18. The symbols may be printed on the respective surface if the latter is formed by a light-transmissive material. As an alternative, the symbols are recessed from an opaque surface.

At the end facing away from the film, each actuating element 24b, 26b, 28b carries a printed circuit board 30, which may be clipped into a groove and, on its surface facing the symbol, includes a light-emitting element 34 or a plurality of light-emitting elements, e.g. in the form of a light-emitting diode (LED) and, on the opposite surface, is provided with a switch element 36, e.g. in the form of a snap disk.

A base plate 38 which is rigidly connected with the frame 20 closes the pushbutton switch array on the rear side facing away from the film. The base plate 38 is equipped with contact elements 40 which are each arranged in opposition to a respective one of the switch elements 36 and cooperate therewith.

The invention claimed is:

1. A pushbutton switch array comprising a frame which is covered by a transparent film and has recesses which selectively have an actuating element accommodated therein for displacement or a dummy element accommodated therein so as to be non-displaceable, the actuating elements being provided with symbols on a surface at one end thereof facing the film and holding a printed circuit board at an opposite end, the printed circuit board carrying a switch element that cooperates with a contact element on an adjacent base plate.

2. The pushbutton switch array according to claim 1, in which the actuating elements are light-transmissive in the region of the symbols and light-emitting elements adapted to be selectively activated are arranged on the printed circuit board facing the symbols.

3. The pushbutton switch array according to claim 1, in which the actuating elements are of a cap-shaped design.

4. The pushbutton switch array according to claim 1, in which the switch elements are in the form of snap disks.

5. The pushbutton switch array according to claim 1, for use as a uniform operating panel in a motor vehicle.

* * * * *